Feb. 11, 1936.    L. NAVIAS    2,030,389
SODIUM RESISTANT GLASS
Filed Aug. 11, 1934

Inventor:
Louis Navias,
by Harry E. Dunham
His Attorney.

Patented Feb. 11, 1936

2,030,389

UNITED STATES PATENT OFFICE 2,030,389

SODIUM RESISTANT GLASS

Louis Navias, Schenectady, N. Y., assignor to General Electric Company, a corporation of New York Application August 11, 1934, Serial No. 739,454

3 Claims. (Cl. 176—122)

The present invention in one of its aspects relates to the glass art and in another aspect to the construction of glass containers for electrical discharge devices containing chemically active vapors. Its object is to produce a glass container which is resistant chemically and physically to the decomposing and disintegrating effect of highly heated metallic vapors. In particular, it is the object of my invention to provide a glass suitable for use as a protective coating or glaze upon the interior surface of sodium lamp bulbs, where the glaze is exposed to highly heated and therefore chemically active sodium vapor.

It has been proposed heretofore to coat glass containers which are not inert to hot alkali vapor with a borate substantially devoid of silica. Such borates are not resistant to moisture and weathering influence and tend to deteriorate before the bulb is sealed during the course of manufacture. Glasses containing silica in addition to boric oxide, and commonly termed borosilicates, have been found better suited for this purpose. In accordance with my present invention I have provided new and improved borosilicate glasses which are moisture-resistant while also being more inert chemically to hot sodium vapor and also are more transparent than the borisilicate glasses which have heretofore been employed.

In glasses embodying my invention a content of boric anhydride ($B_2O_3$) of at least about 50 per cent and less than 75 per cent and silica ($SiO_2$) in an amount greater than about 3 per cent and less than about 15 per cent, are associated with other glass-forming constituents in which the sodium oxide ($Na_2O$) should be less than about 10 per cent.

Figure 1:
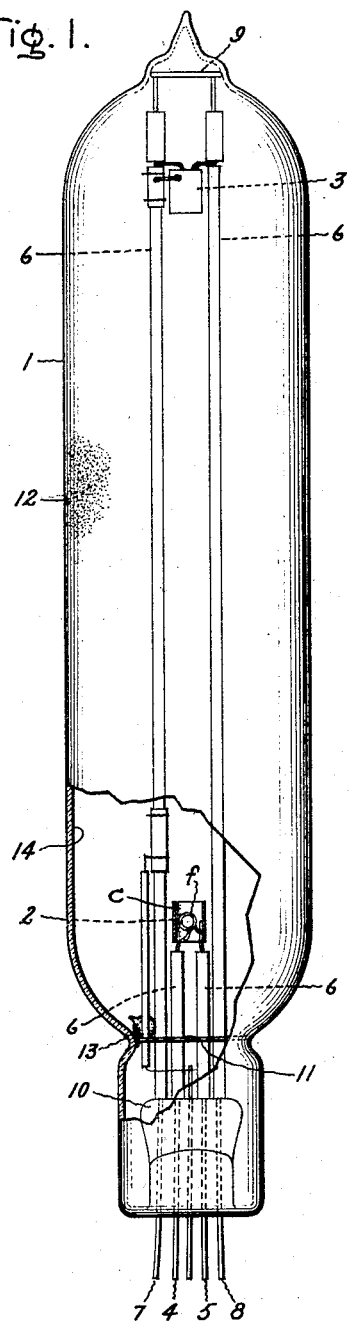
Figure 2:
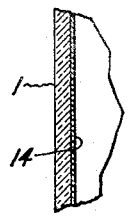

The accompanying drawing shows in Fig. 1 a vapor lamp embodying my invention and in Fig. 2 is shown an enlarged detail view of a section of a portion of the glass wall.

The lamp shown in Fig. 1 comprises an elongated glass container 1 at the opposite ends of which are located electrodes 2, 3 between which an arc discharge operates through the gaseous contents of the container. This lamp is of the type shown in copending application Serial No. 642,882, filed November 16, 1932, by Andrew H. Young (see corresponding British Patent 405,232). The particular electrodes here shown consist of a coiled filamentary member $f$, which ordinarily consists of nickel coated barium oxide, or other thermionically active material, and a surrounding cylindrical member $c$, which also may consist of nickel (see electrode 2) and which is electrically connected to member $f$. The filamentary member $f$ is supplied with heating current by the leading-in conductors 4, 5 which are sealed into the glass envelope as usual and are surrounded by protective sleeves 6 of refractory material. The electrode 3 is similarly connected to the conductors 7, 8 (also surrounded by a refractory sleeve) which are kept from unduly vibrating by an anchor 9 engaging with the glass container. The sealing region of the envelope adjacent the stem 10 is shut off from the vapor space by a partition 11. The container first is evacuated during fabrication of the lamp, then is charged with a luminosity-producing vapor, such as sodium for example, as indicated at 12. Other vaporizable materials, such as potassium, cadmium, zinc, and the like, may be used in such lamps. The sodium or the like may be introduced from a small glass capsule 13 which is broken when the material therein is to be released. A gas, such as neon, or argon, also may be present, usually at a pressure of two or three millimeters of mercury.

As shown in Fig. 2, the inner surface of the glass envelope 1 is lined with a glass or glaze 14 which is resistant to the disintegrating effect of the alkali vapor, or whatever gaseous filling may be employed. The thickness of the glaze 14 may be less than here shown. My invention is concerned particularly with the composition of such protective coating.

As illustrative of my invention is a glass containing the following constituents which I have found particularly suitable for coating the interior wall surface of glass containers for sodium lamps when made of what is known as Corning 705 A J Glass, which is a borosilicate glass having a thermal coefficient of linear expansion of 4.6 x $10^{-6}$, but not being immune to alkali vapor.

Example 1

| | Parts |
|---|---|
| Sodium oxide ($Na_2O$) | 6 |
| Aluminum oxide ($Al_2O_3$) | 13 |
| Calcium oxide (CaO) | 10 |
| Boron oxide ($B_2O_3$) | 66 |
| Silica ($SiO_2$) | 5 |

The preparation of a glass of such composition from available glass-making materials is well understood and need not be described in detail for a complete disclosure of my invention. For the purpose of illustration, there is given below the composition of a batch of raw glass-forming materials which will yield upon fusion (preferably in a platinum crucible) a glass of the above composition. As glass makers can readily determine suitable batch compositions from the stated analyses of the glasses, only one batch composition will be given. A fusion mixture yielding a glass having the above composition may consist of the following ingredients:

BATCH MIXTURE

Example 1

| | Parts |
|---|---|
| Sodium carbonate | 10.3 |
| Aluminum oxide | 13.0 |
| Calcium carbonate | 17.9 |
| Boric acid | 117.2 |
| Quartz | 5.0 |

When the fusion is complete, the platinum crucible may be quickly cooled to cause separation of the contents from the chilled walls of the crucible. The glass thus produced is crushed and ground while being kept free from moisture. The powdered product preferably is stored until desired for use in a space maintained at a temperature above 100° C. It may be applied while suspended in an organic liquid to the inner surface of the lamp bulb, the liquid being evaporated after the film has been applied. The residual film of powdered material is fused by heating the bulb until a substantially clear coating results, which is indicated in Fig. 2 at 14 in magnified proportion.

The proportions of the constituents of the glasses embodying my invention may be varied within the limits above indicated providing a proper relation is maintained between the various ingredients to result in a glass having a suitable coefficient of expansion and other desired physical properties as will appear from the illustrative examples.

Example 2

A glass of the following composition has been found to be particularly suitable for coating bulbs consisting of the so-called Pyrex Glass, made by the Corning Glass Works, which is a boro-silicate glass, having a coefficient of linear thermal expansion of 3.2 x $10^{-6}$.

| | Parts |
|---|---|
| Sodium oxide ($Na_2O$) | 4 |
| Aluminum oxide ($Al_2O_3$) | 10 |
| Calcium oxide (CaO) | 10 |
| Boron oxide ($B_2O_3$) | 69 |
| Silica ($SiO_2$) | 7 |

Example 3

The amount of aluminum oxide may be decreased without substantially departing from the properties of the glass of Example 1. The following is an analysis of a glass containing a lower percentage of alumina and embodying my invention.

| | Parts |
|---|---|
| Sodium oxide ($Na_2O$) | 6 |
| Aluminum oxide ($Al_2O_3$) | 10 |
| Calcium oxide (CaO) | 10 |
| Boron oxide ($B_2O_3$) | 69 |
| Silica ($SiO_2$) | 5 |

Example 4

It is likewise possible to increase the percentage of silica considerably without departing from the properties of glass such as produced by the above examples. The following is an example of a glass embodying my invention having a relatively high silica content:

| | Parts |
|---|---|
| Sodium oxide ($Na_2O$) | 6 |
| Aluminum oxide ($Al_2O_3$) | 13 |
| Calcium oxide (CaO) | 10 |
| Boron oxide ($B_2O_3$) | 56 |
| Silica ($SiO_2$) | 15 |

Other examples of glasses embodying my invention are the following:

Example 5

| | Parts |
|---|---|
| Sodium oxide ($Na_2O$) | 6 |
| Aluminum oxide ($Al_2O_3$) | 10 |
| Calcium oxide (CaO) | 10 |
| Boron oxide ($B_2O_3$) | 66 |
| Silica ($SiO_2$) | 8 |

Example 6

| | Parts |
|---|---|
| Sodium oxide ($Na_2O$) | 10 |
| Aluminum oxide ($Al_2O_3$) | 20 |
| Calcium oxide (CaO) | 10 |
| Boron oxide ($B_2O_3$) | 50 |
| Silica ($SiO_2$) | 10 |

The glass of this example is suited especially for glazing bulbs consisting of glass having a coefficient of linear expansion of 7 to 8 x $10^{-6}$.

Example 7

Another example of my invention is a glass containing magnesia replacing part of the line. A typical analysis is as follows:

| | Parts |
|---|---|
| Sodium oxide ($Na_2O$) | 9 |
| Aluminum oxide ($Al_2O_3$) | 12 |
| Calcium oxide (CaO) | 3 |
| Magnesium oxide (MgO) | 5 |
| Boron oxide ($B_2O_3$) | 66 |
| Silica ($SiO_2$) | 5 |

What I claim as new and desire to secure by Letters Patent of the United States is:

1. In combination with an electrical discharge device which contains a quantity of chemically active material and comprising a container which is susceptible to chemical attack by said material, a lining for said container comprising a borosilicate glass, the boric anhydride content of which is within the limits of about 50 to 75 per cent, the silica content of which is within the limits of about 3 to 15 per cent, and the oxide of alkali metal is less than about 10 per cent.

2. In combination with an electrical discharge device which contains a quantity of chemically active material and comprising a container which is susceptible to chemical attack by said material, a lining for said container comprising a borosilicate glass, containing the following ingredients in the proportions indicated:

| | Parts |
|---|---|
| Sodium oxide ($Na_2O$) | 6 |
| Aluminum oxide ($Al_2O_3$) | 13 |
| Calcium oxide (CaO) | 10 |
| Boron oxide ($B_2O_3$) | 66 |
| Silica ($SiO_2$) | 5 |

3. A composite glass container comprising a wall of glass which is subject to attack by alkali vapor and a protective glaze thereon consisting of borosilicate glass, the boric anhydride content of which is within the limits of 50 to 75 per cent, the content of silica of which is within the limits of 3 to 15 per cent, and the content of sodium oxide is less than about 10 per cent, said glaze being immune to attack by such vapor.

LOUIS NAVIAS.